United States Patent [19]

Savioli

[11] 4,155,694

[45] May 22, 1979

[54] DEVICE FOR FORMING THE GASKET HOUSING IN THE SOCKET JOINTS OF PLASTIC MATERIAL TUBES

[75] Inventor: Leopoldo Savioli, Alfonsine, Italy

[73] Assignee: SICA S.p.A., Alfonsine, Italy

[21] Appl. No.: 911,391

[22] Filed: Jun. 1, 1978

[30] Foreign Application Priority Data

Jun. 21, 1977 [IT] Italy ................................ 46312 A/77

[51] Int. Cl.² ............................................ B29C 17/00
[52] U.S. Cl. .................................... 425/403; 425/392; 425/393; 425/DIG. 218
[58] Field of Search ............. 425/392, 403, DIG. 218, 425/393

[56] References Cited

U.S. PATENT DOCUMENTS

| | | | |
|---|---|---|---|
| 3,377,659 | 4/1968 | Hucks | 425/392 |
| 3,484,900 | 12/1969 | Sands et al. | 425/393 |
| 3,776,682 | 12/1973 | Parmann | 425/388 X |
| 3,907,481 | 9/1975 | Heisler | 425/393 |
| 4,030,872 | 6/1977 | Parmann | 425/393 |
| 4,061,459 | 12/1977 | Parmann | 425/393 X |

*Primary Examiner*—J. Howard Flint, Jr.
*Attorney, Agent, or Firm*—Browdy and Neimark

[57] ABSTRACT

Disclosed herein is a device for forming the gasket housing in the socket joints of plastic material tubes, comprising a ring placed inside a housing made circumferentially in an expander that can be inserted in the end of the tube to be widened, the said ring comprising a first ring, that is to say, an inner ring, provided internally and circumferentially with a groove defining the chamber on which the expansion compressed air acts, the said first ring being made of an elastic material that "gives"; a second ring that can be coupled externally and coaxially to the said first ring, made of an elastic material of a hardness somewhat greater than that of the aforementioned first ring; and a number of metal pins, parallel with one another, placed over the outside circumference of the said first ring.

2 Claims, 4 Drawing Figures

DEVICE FOR FORMING THE GASKET HOUSING IN THE SOCKET JOINTS OF PLASTIC MATERIAL TUBES

The device forming the subject of the present invention is used on machines that attend to the task of widening the ends of plastic tubes in the form of a bell so that the non machined extremity of a bar or tube can be inserted in the said widened end to form a joint commonly known as a spigot and socket joint.

The plastic material out of which the tubes are made is generally P.V.C. (polyvinyl chloride), though it can also be PE (polyethylene) or PP (polypropylene) or some other material. The machines used for the bell shaping operation are commonly known as "bell shapers". The operations to which the plastic tube is subjected prior to and after its entry into the bell shaper are more or less complicated, depending upon the complexity of the machine itself but fundamentally they only fall into two phases, namely the heating phase and the the forming phase, the latter being more commonly known as the bell shaping phase. The purpose of the heating phase is to plastify the material, that is to say to carry it to a softening temperature, whilst that of the bell shaping phase is to give the softened part a shape whereby it becomes a bell having the dimensions and the measurement tolerances laid down in the standards relevant thereto. It is obvious that the more the bell shaped socket complies with the dimensions and tolerances required by the standards, the higher their quality level, and it thus ensues that the quality of the bell shaper is of the best when it is able to always give the parts identical dimensions and measurement tolerances, that is to say, when it can guarantee product repeatability.

The special attention given by manufacturers of the bell shaping machines to solving the most important problem in the bell shaping operation, that is to say, the defining of the inside coupling dimensions for the socket is, therefore, justified, and whilst this is something that can be easily overcome over the full cylindrical part of the bell, it is not equally simple insofar as the part where the sealing gasket, or rubber ring, has to fit, is concerned.

In this particular connection simple systems and sophisticated systems have been designed with which to solve the problem. The simple systems tackle the problem without solving it, whilst the sophisticated systems solve it excellently but in a way that is costly and because it calls for high precision engineering, puts up the cost of bell shaping equipment and of the maintenance costs for the said equipment.

The main object of the present invention is, therefore, to make available a device for forming the gasket housing in the socket joints of tubes which, because of the extremely simple way in which the various component parts of the said device are manufactured and assembled, is able to guarantee a high degree of working precision and reduced maintenance costs.

Further characteristics and advantages of the device forming the subject of the present invention will emerge more clearly from the following description of a preferred form of embodiment, illustrated purely as an example on the accompanying drawings in which.

With reference to the accompanying figures, at (4) there is an expander that extends cylindrically and follows exactly with its external shape, the internal shape it is wished to give to the tube being machined, the said expander being inserted inside the heated extremity of the tube.

Whilst the parts of the expander that can be extracted from the bell socket once it has cooled are rigidly fastened to one another and are made of material such as to ensure the socket having the aforementioned dimensions and tolerances, it has to be possible, upon completion of the shaping operation, for the other parts that serve to mould in the joint the housing for the gasket (shown at 5 in FIGS. 2 and 3), to be retracted in order to allow the expander to be taken out of the socket, and the device it is wished to describe herein refers explicitly to the said retractible parts.

Figure 2:
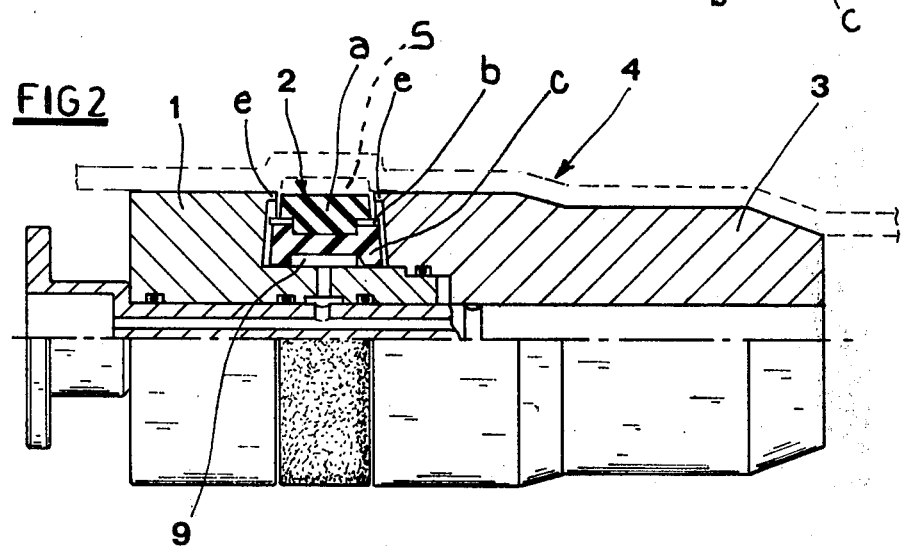
FIGS. 2 and 3 show, diagrammatically, in a sectional view, the device forming the subject of the present invention in its extreme positions, that is to say, its non-operative and its operative position, respectively.
Figure 3:
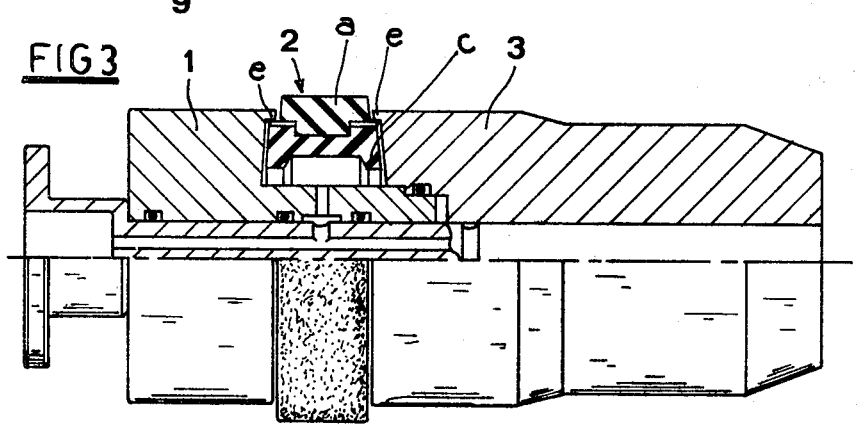

FIG. 2 shows a group in which the members (1) and (3) diagrammatically represent the body of the expander, the member (2) being the gasket housing moulder, that is to say, the device that constitutes the subject of the present invention and is virtually an elastic ring coaxial to the expander, which, under the stress of compressed air, entering from the channel (d), adopts the equilibrium shown in FIG. 3, which is the operative position; that depicted in FIG. 2 corresponds to the non-operative position.

The said ring consists substantially of three parts, (a), (b) and (c), respectively, one for each of the functions the device is called upon to perform.

Figure 1:
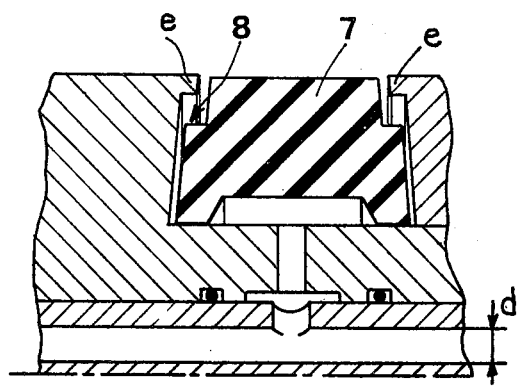
FIG. 1 shows, diagrammatically, in a sectional view, the device according to methods previously adopted.

In the known art, the device according to the present invention is generally as shown in FIG. 1, wherein an elastic ring (7) is customarily employed for the purpose of forming the housing for the gasket in plastic bells, and it should be noted that the high degree of elasticity the ring has to have for it to guarantee its radial expansion, cannot be accompanied by a hardness such as to ensure the shape of the ring being faithfully transferred to the material to be moulded, and its being repeated as time goes by, nor, on the other hand, once the expansion has ceased, can the exact diametrical configuration of the ring be ensured since this is dependent on the resting against the rigid restraining members (e) of the expander, of the shoulders (8) of the ring, which, in turn, lose their shape depending upon the ever differing forces present.

Figure 4:
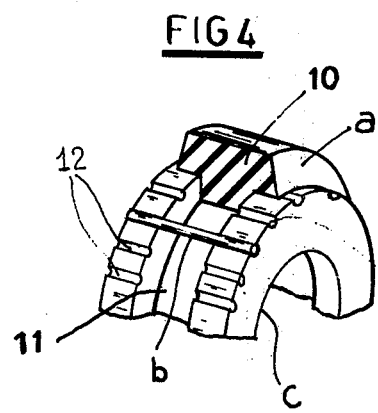
FIG. 4 shows, diagrammatically, in a perspective view, the device according to the present invention.

It is, therefore, to be excluded in practice that the simple elastic ring under consideration can contemporaneously embrace the characteristics of hardness, elasticity and of mechanical efficiency but, if as stated above, the said characteristics are considered as being separate from one another, and if for each one the member most suited to represent it is present, then put jointly together, a harmoniously functional group constituted by the double elastic ring with steel shoulders, as per FIG. 4, is formed.

The letter (c) indicates a first ring, that is to say, an inner ring provided circumferentially and internally with a groove (9), defining the chamber on which the expansion compressed air exiting from the duct (d) acts, and this ring is entrusted with the task of transforming the pressure of the compressed air into an amalgamation of forces directed radially from the centre towards the periphery. The said ring is made of a particularly soft material in which elasticity is the main characteristic with which to guarantee a high number of working cycles and thus a long life span.

The letter (a) indicates a second ring whose task it is to impress its shape or profile into the plastic material with which it comes into contact. This second ring is made of plastic material of the maximum hardness compatible with its elasticity, which must be sufficient to guarantee the return to the non-operative position after the working expansion. Circumferentially, in the inside, the said second ring is provided with a projection (10) which, as will be seen, can be inserted into a corresponding housing (11) machined along the outside circumference of the previously mentioned ring (c).

The letter (b) indicates the system control member through which it is guaranteed that, during the expansion phase, the ring (a), thrust by the ring (c), reaches but does not exceed the established diametrical configuration (see FIG. 2.)

The said system control member is constituted by a number of metal pins placed over the outside circumference of the said first ring, and it is of fundamental importance since the mechanical check resulting therefrom frees the position reached by the ring (a) from any source of error related to the forces in play. There can, in fact, be variations between the forces that stretch the rings, between the friction forces that brake the foregoing forces, and between the counter-acting forces of the plastic material being machined; to this it should be added that the rings themselves change their mechanical characteristics with the passing of time and that two identical rings certainly have different characteristics. Thus the presence of the system control member (b) ensures the diametrical configuration reached by the ring (a) once the expansion is over, being free from possible variations originated by the aforementioned causes. The said pins, which are parallel with one another and are locked in corresponding holes machined into the ring (a) and are partly contained in corresponding slots (12) in the ring (c), constitute the ledge or shoulder that touches against the edges (e) of the expander during the expansion phase, and in this way, each of the said pins acts as one of a number of elementary beams that rest against the metal projections on the expander, block the action of the counter acting forces present and create a fully stable equilibrium which, above all, does not give rise to wear on the part of the ring (c).

It should also be noted that the important characteristic of this system is the possibility of varying the diametrical configuration of the ring (a) by modifying on the expander, the diameter of the metal projections (e) against which the pins find support.

To conclude, by fitting the two rings (a) and (c), respectively, one over the other, a single group is formed, and this has hardnesses that differ and a rim of steel pins for effecting a mechanical check on the diametrical dimensions once expansion has ended.

What is claimed is:

1. Device for forming the gasket housing in the socket joints of plastic material tubes, of the type consisting of a ring placed inside a housing made circumferentially in an expander that can be inserted in the end of the tube to be widened, characterized by the fact that it comprises a first ring, or inner ring, provided internally and circumferentially with at least one groove defining the chamber on which the expansion compressed air exiting from a duct leading from the base of the said expander housing acts, the said first ring being made of an elastic material that "gives", and a second ring, that can be coupled externally and coaxially to the said first ring, the outside of which is provided with a profile complementary to the shape it is wished to give the plastic tube, the said second ring being made of an elastic material of a hardness somewhat greater than that of the aforementioned first ring.

2. Device according to the preceding claim, characterized by the fact that it comprises a number of metal pins, parallel with one another, placed over the outside circumference of the said first ring, these defining bilaterally to the ring, a cylindrical ledge for the said first ring to rest against the limit edges of the expander during the widening phase when the device is forming the gasket housing in the tube.

* * * * *